United States Patent [19]
Aronson

[11] 4,155,446
[45] May 22, 1979

[54] STORING AND DISPLAYING COLOR MARKERS

[76] Inventor: George L. Aronson, 500 Governor's Dr., Apt. #1, Winthrop, Mass. 02152

[21] Appl. No.: 886,787

[22] Filed: Mar. 15, 1978

[51] Int. Cl.² ............... B65D 5/52; A45C 11/34; B65D 85/20
[52] U.S. Cl. .................... 206/45.14; 35/26; 206/214; 206/371; 206/459
[58] Field of Search ........... 206/371, 459, 214, 45.14, 206/1.7, 1.8; 211/69.1, 69; 35/26

[56] References Cited

U.S. PATENT DOCUMENTS

| | | | |
|---|---|---|---|
| 1,296,158 | 3/1919 | Bonham | 206/45.14 |
| 1,747,486 | 2/1930 | Ridgway | 206/45.14 |
| 1,784,952 | 12/1930 | Wolfson | 206/459 |
| 2,446,896 | 8/1948 | Wellman | 35/26 |
| 2,637,299 | 5/1953 | Salkey | 206/45.14 |

*Primary Examiner*—William T. Dixson, Jr.
*Attorney, Agent, or Firm*—Charles Hieken

[57] ABSTRACT

A color marker container has a wall with holes separated by twice the marker diameter, into which the markers may be inserted, the wall around each hole being colored the same as one of the markers, the names of the colors being imprinted on the wall near the openings.

3 Claims, 1 Drawing Figure

STORING AND DISPLAYING COLOR MARKERS

BACKGROUND OF THE INVENTION

The invention relates in general to the storage and display of color markers and more particularly concerns novel apparatus and techniques for using the same container in which the markers are shipped for supporting them in a manner that provides easy access for use by small children while helping the children learn the colors.

Color markers, such as crayons, pencils, chalk, and felt tip pens, are popular children's playthings as well as important tools of learning. They are usually purchased in simple containers in which the markers are mixed. Continued storage in the containers means ordinarily that the markers are returned to the container in some random fashion, making it difficult for the child using such markers to classify and identify the colors he or she uses and use the full range of colors available.

Accordingly, it is an object of the invention to provide a container for color markers that will facilitate a child's use and understanding of colors.

It is another object of the invention to provide in a container both a storage and display function in accordance with the preceding object.

It is still another object of this invention to provide a container from which color markers may be easily identified and removed by a small child in accordance with one or more of the preceding objects.

It is still another object to provide such a container which is inexpensive and easily manufactured in accordance with one or more of the preceding objects.

SUMMARY OF THE INVENTION

According to the invention, a container for the storage of color markers of various colors includes means for holding the markers in a spaced apart relationship, elements of the holding means being colored in the various colors corresponding to the markers, the elements being colored and located to indicate the color of the marker holdable in the holding means nearest the element.

According to another feature of the invention each element has imprinted on it the name of the appropriate color.

According to still other features of the invention, the container is adapted to form a stable base and has an upper wall defining holes into which the color markers may be inserted, the outside surface of the wall having colored portions surrounding the holes, each colored portion being the color of one of the markers and having imprinted on it the name of the color, the holes being separated by a distance greater than the largest cross-sectional dimension of the markers.

Numerous other features, objects and advantages of the invention will become apparent from the following specification when read in connection with the accompanying drawing the single FIGURE of which:

BRIEF DESCRIPTION OF THE DRAWING is a perspective view of an exemplary embodiment of the invention.

DETAILED DESCRIPTION OF PREFERRED EMBODIMENTS

Figure 1:
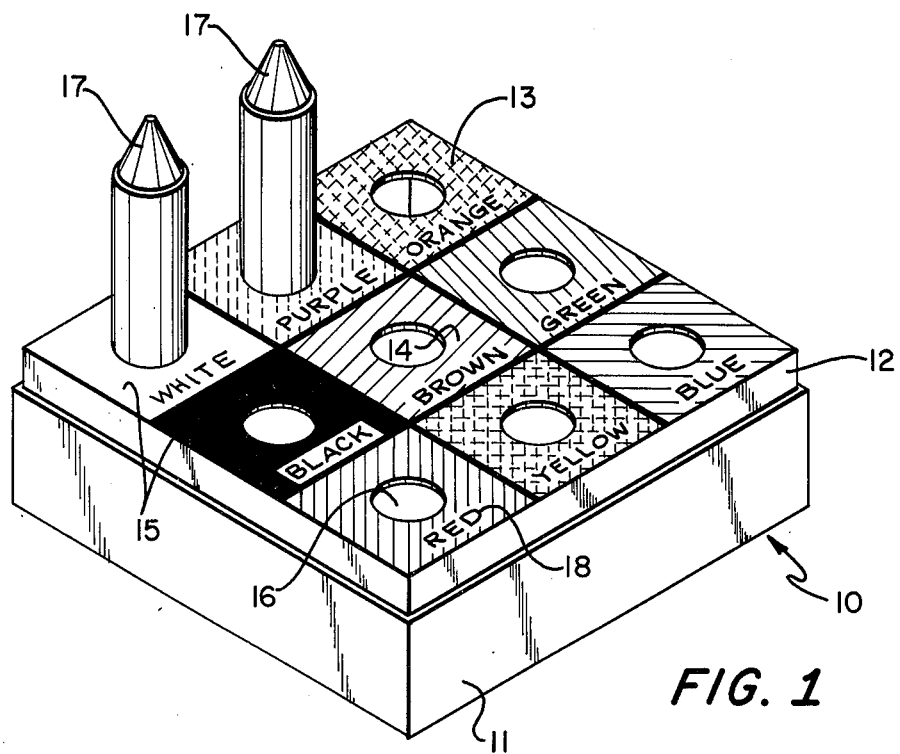

With reference now to the drawing there is shown a rectangular crayon box 10, for storing nine crayons of various colors. The box has a top cover 11 and a bottom 12. The box 10 is shown upside down, so that the bottom wall 13 of the box is shown uppermost.

The surface 14 of bottom wall 13 is divided into nine square elements or portions 15. Each portion 15 is colored a different color, corresponding to the nine colors of the nine crayons. In the center of each portion 15 is a circular hole 16 through bottom wall 13, slightly larger than the cross section of one of the crayons. As shown in the FIGURE, two of the holes 16 are occupied by crayons 17.

Imprinted on each of the portions 15 of the surface 14 of bottom wall 13 is the name 18 of a color. The color name 18 is that of the color on the surface portion 15, and therefore the color of one of the nine crayons.

The holes 16 shown are separated from each other by a distance about equal to twice the diameter of the crayons 17.

In use, the crayons 17 may be stored inside the closed crayon box 10. When they are removed, the box 10 may be turned upside down (as shown in the drawing), and the crayons 17 may be conveniently displayed for easy access to a small child by inserting them in holes 16. Each crayon 17, ordinarily is put into the hole 16 in the square with the color and color name 18 corresponding to the color of the crayon 17, familiarizing the child so placing them with the color associated with the crayon.

The child setting up such a display of crayons 17, or working with such a display set up by an adult, will become familiar with the range of colors available, and will be helped in classifying and arranging colors. The appearance of the color name 18 on the surface portions 15 near the holes 16 will familiarize the child beginning to read with the names of colors.

The distance between the crayons 17 inserted in holes 16, about twice the diameter of a crayon 17, allows them to be easily grasped and removed by a child. That distance may vary, of course, depending on the diameter of the color marker. Ordinarily, it appears that the distance should be greater than the diameter of whatever marker is used to provide a minimum of accessibility. A distance of twice the diameter is preferred, to maximize the ease with which a child may grasp the marker. The marker may not necessarily be cylindrical, of course, though most of them are. If it is not, the rule of thumb adopted is to separate the holes by a distance greater than the largest cross-sectional dimension of the marker.

After the crayons 17 are used, they may be removed from the holes 16 and stored away inside the box 10. They may, on the other hand, remain in the holes 16 and on display for long periods of time.

In the embodiment shown, the crayon box bottom 12 is shown as the location of the holes 16 and the colored surface portions 15 and color names 18. In this way, the box's top 11 may bear the usual trademarks and package information about the contents of the box when the package is distributed and sold. However, the top may be just as suitable a wall for the holes and color coding, with whatever information that is necessary appearing on the side of the box or a portion of the top set aside and not occupied by holes or color coding.

Furthermore, the container may take any shape. It may be round, for example, if that shape is considered appealing. It is desirable for the container to provide a stable base, so that the display, when markers are inserted in holes in one of the walls of the container, is stable.

Also, the display area of the container need not be different from the storage area for the color markers. If the container is large enough, the color markers may be stored in compartments of some type inside the container, in which the compartments are color coded, and color names appear sufficiently distinctly in or near the compartments so that the proper location of the appropriate color marker may be easily found. It is an important feature of the invention, however, that in whatever kind of compartment or holder the color markers are displayed, the markers not be grouped closely together, but that adequate separation exists so that the markers are not merely available for selection, but are so far apart that they may be easily grasped by a child's hand.

There have been described various containers for storing and displaying color markers that will facilitate a child's use and understanding of colors. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A container for the storage of color markers of various colors, including means for holding said markers in a spaced apart relationship by a distance at least substantially equal to the largest cross-sectional dimension of the markers, elements of said holding means being colored in the various colors corresponding to said markers, said elements being colored and located to indicate the color of the corresponding marker holdable in said holding means nearest said element, said means for holding comprising a wall of said container formed with openings corresponding substantially to the cross section of said markers into which said color markers may be inserted, the external surface portions of said wall about said openings being colored in correspondence with a respective one of the various colors of said color markers.

2. A container as claimed in claim 1 in which each said element has imprinted on it the name of the appropriate color.

3. The container of claim 1 in which said holding means includes means for holding said color markers parallel to each other.

* * * * *